3,324,134
QUATERNARY AMMONIUM XANTHATES
Reginald L. Wakeman, Philadelphia, Pa., Edward Griffin Shay, Belle Mead, N.J., and Samuel Steinberger, Brooklyn, N.Y., assignors to Millmaster Onyx Corporation, New York, N.Y., a corporation of New York
No Drawing. Filed Oct. 15, 1965, Ser. No. 496,720
3 Claims. (Cl. 260—286)

This application is a continuation-in-part of our application, Ser. No. 387,517, filed Aug. 4, 1964.

The object of the present invention is the preparation of microbiologically active compounds by the reaction of certain water-soluble quaternary ammonium salts with alkali-metal salts of esters of dithiocarbonic acid, otherwise known as xanthates.

The products of this invention conform, in general, to the following structure:

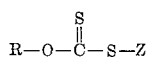

wherein Z is the cation of a microbiologically active quaternary ammonium compound and R is the residue in its ordinarily understood chemical significance of an aliphatic or arylaliphatic alcohol or polyalcohol.

Xanthates for use in this invention may be formed by condensing carbon disulfide and sodium hydroxide with a hydroxylated compound containing from 2 to 12 carbon atoms such as ethyl, isopropyl, propyl, butyl, octyl or dodecyl alcohol, benzyl alcohol, phenethyl alcohol and the like; or a polyhydric alcohol such as 2 methyl-2,4 pentanediol (hexylene glycol) or 2 ethyl-1, 3 hexanediol and the like; or an ether alcohol such as ethylene glycol monethyl or monobutyl ether, diethylene glycol monomethyl ether, ethylene glycol monophenyl ether and the like, in proportions to yield about one dithiocarbonate group per molecule. Some of the alkali-metal salts of dithiocarbonate esters are articles of commerce.

Typical examples of the quaternary ammonium compounds which may be used in this invention are the alkyl dimethyl benzyl ammonium chlorides, alkyl dimethyl menaphthyl ammonium chlorides, alkyl dimethyl substituted-benzyl ammonium chlorides in which the benzyl radical is substituted with one or more chains containing from 1 to 5 carbon atoms such as, for example, as methyl, dimethyl, ethyl and the like and in which the carbon atoms may all be in the same or different side chains or in which the benzyl radical bears one, two or more halogen atoms such as chlorine or bromine, and alkyl isoquinolinium chlorides and bromides.

In general, the quaternary ammonium compounds useful in this invention are the higher alkyl quaternary ammonium hydroxides, halides (chlorides and bromides), sulfates, methosulfates and the like possessing the following formula:

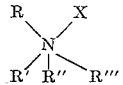

where R is an alkyl radical containing from 8 to 22 carbon atoms; R' and R" are methyl radicals; and R''' is a benzyl group or a substituted-benzyl group such, for example, as a monochlorobenzyl radical or a dichlorobenzyl radical or mixture thereof or a methyl benzyl, dimethyl benzyl, ethyl benzyl, diethyl benzyl, isopropyl benzyl, tertiary butyl benzyl or another benzyl radical containing from 1 to 5 carbon atoms as side chains, either as a single side chain or a multiplicity of side chains including mixtures thereof; or a menaphthyl group or hydrogenated menaphthyl group; or R', R" and R''' are members of an unsaturated heterocyclic ring such as isoquinoline. X in the above formula corresponds to a halide radical such as chloride, bromide or iodide or to any other water-soluble anion such as methosulfate.

In general, we prefer to use such quaternary ammonium compounds which have a phenol coefficient of more than 500 with respect to *Staphylococcus aureus* at 20° C. when determined by the standard method given in the "Official Methods of Analysis of the Association of Official Agriculture Chemists," Ninth Edition (1960), page 63 et seq.

For example, the quaternary ammonium compounds listed below and which are employed in the Examples 1 to 6 given hereinafter were found to have minimum phenol coefficients as designated in the following table:

| | |
|---|---:|
| Alkyl dimethyl ethyl-benzyl ammonium chloride in which the alkyl distribution is 50% $C_{12}$, 30% $C_{14}$, 17% $C_{16}$, 3% $C_{18}$. (BTC–471 Onyx Chemical Corp. | 900 |
| Alkyl dimethyl benzyl ammonium chloride in which the alkyl distribution is 60% $C_{14}$, 30% $C_{16}$, 5% $C_{12}$, 5% $C_{18}$. (BTC–824 Onyx Chemical Corp.) | 736 |
| Dodecyl dimethyl menaphthyl ammonium chloride. (BTC–1100 Onyx Chemical Corp.) | 1000 |
| Alkyl isoquinolinum bromide in which the alkyl distribution is 50% $C_{12}$, 30% $C_{14}$, 17% $C_{16}$, 3% $C_{18}$. (Isothan Q–75 Onyx Chemical Corp.) | 635 |

However, we do not restrict ourselves to the above, but may employ other quarternary ammonium salts of the class above described which have a phenol coefficient of more than 500 against *Staphylococcus aureus*.

The compounds of this invention may be prepared by mixing aqueous solutions of the quaternary ammonium salts with an aqueous solution of the alkali-metal salt of the dithio-carbonate ester in question.

After thorough mixing, the organic product layer is separated from the aqueous layer (as with a separatory funnel) since two distinct phases are formed. Separation may be facilitated by the addition of an organic solvent immiscible with water. The product layer may be washed with water to remove any residual by-product salt or unreacted materials. The solvent, if any, may be evaporated and the product air or vacuum dried to a paste, wax, oil or solid.

It is not necessary to use an aqueous medium. Any solvent or solvent mixture in which the starting materials are soluble will be satisfactory. Non-aqueous solvents facilitate the separation of by-product inorganic salt and reduce the need for vacuum drying to get an anhydrous product. When a non-aqueous medium is employed, it is usually necessary to add a small amount of water to facilitate ionic reaction.

The product may be used, if desired, without drying since any entrapped water is irrelevant to the microbiological activity of the compounds. In other applications, removal of water may be essential for reasons not related to biological activity.

An alternative method for the preparation of compounds especially applicable to the treatment of fabric, ropes, net, woven and non-woven fabric and reticulated or convoluted materials involves a two-step process. In the first step, the material is passed through a bath containing the anionic moiety. Excess solution is removed by methods well known to those skilled in the art. The treated material is then passed through a second bath wherein the concentration of quaternary ammonium compound is such that the material pickup will result in an equivalent amount of quaternary ammonium compound reacting with the anionic moiety, depositing the product in the most intimate way on the surface and in the interstices, convolutions and reticulations of the material.

The method of adjustment of solution concentration to achieve the required pickup is well known to those skilled in the art. The order of treatment may be reversed without affecting the biological activity or durability of the product on the material. The products of this invention may be formulated as water dispersions by dissolving them in a water miscible organic solvent such as acetone or methanol and diluting with water or by dissolving them in emulsifiable oils such, for example, as sulfonated castor oil or pine oil and diluting with water. In preparing aqueous dispersions, emulsifying agents such, for example, as ethylene oxide condensates of alkyl phenols may be used with or without organic solvents.

It is surprising that the compounds of this invention exhibit high microbiological activity despite their relative insolubility in water. Because of their unusual combination of physical and microbiological properties, they can be used to impart laundry-resistant anti-microbial characteristics to textiles. They can also be used as the active agent in anti-mildew finishes for textiles which are resistant to leaching with water.

Although the compounds have low water solubility, they are compatible with various organic solvents, plasticizers and high molecular weight compounds. Consequently, they may be incorporated as anti-microbial agents in synthetic resins and plastics. The compounds are compatible with natural and synthetic rubber latices. Therefore, they may be used to prepare bacteriostatic films and molded objects deposited from such latices.

The compounds can be incorporated into cutting and grinding fluids without precipitation. Also, they blend well with non-ionic and anionic surface active agents. In such compositions they retain their microbiological activity.

It will be understood that the properties of the products described herein will vary depending upon the nature of the cationic quaternary ammonium compound used in their preparation as well as the anionic compound reacted therewith.

The chemical, physical and biological properties of the products of our invention make them especially appropriate for the following applications when suitably incorporated in active amounts in an appropriate vehicle, binder, medium or substrate:

(1) Mildewproofing fabric, canvas, ropes, textiles, awnings, sails, tenting and other woven and non-woven reticulated materials.
(2) Paint mildewstats.
(3) Jet plane fuel additive to control growth of microorganisms.
(4) Odor preservative agents for clothes and shoes.
(5) Mildew retardant and odor suppressant for shoes and other leather products.
(6) Topical antiseptics.
(7) Antidandruff agents.
(8) Disinfection agents for hair and gut of man and beast.
(9) Bacteriostatic furniture dressing.
(10) Surface finishes for stone, plaster, tile, cement, brick and other inorganic building materials to retard growth of microorganisms, fungi, mold and algae.
(11) Wool preservative.
(12) Plant and tree spray to combat fungi.
(13) Antimycotic agents for soap wrappers.
(14) Self-sanitizing brushes.
(15) Mildewproofing agent in and on plastic and film.
(16) Mildewproofing of cellulosics, cardboard, fibreboard, paper and cordage.
(17) Contact biostat for application to film, waxes and cloth to preserve cheese, meats and vegetables and other food products.
(18) Algal inhibition, especially on surfaces and in solution where low foaming is desirable.
(19) Paper pulp slime control.
(20) Sanitizing agent for rug, carpet, curtains.
(21) Egg preservation.
(22) Adhesive preservation.
(23) Preservation of latex paints.
(24) Preservation of metal-working compounds.
(25) Additives for soap and for both anionic and non-ionic detergents in liquid, bar, powder, bead, solution and other forms to impart bacteriostatic and fungistatic properties thereto.
(26) Bacteriostatic agents for household laundry softeners.
(27) Algastat and bacteriostat in recirculated water for cooling towers, air conditioners and humidifiers.
(28) Bacteriostat and algastat for flood waters and brines used in secondary oil recovery.
(29) Fungstat for seed and soil treatment against damping-off.

The microbiological activity of our compounds is of the same order as that of the water-soluble quaternary ammonium salts from which they are prepared; in some cases they are appreciably higher.

The invention is illustrated by, but not restricted to, the following examples:

*Example I*

A 10% stock solution of potassium ethylxanthate was prepared in water. An aliquot of this solution containing 0.024 molecular weights of the compound was agitated vigorously while adding a chemically equivalent amount of a 10% solution of a commercial grade of an alkyl dimethyl ethyl-benzyl ammonium chloride (Onyx Chemical Corporation's "BTC–471" in which the alkyl distribution is 50°% $C_{12}$, 30% $C_{14}$, 17% $C_{16}$, 3% $C_{18}$). The mixture was transferred to a separatory funnel wherein it separated into two phases. The organic product layer was removed and dried in vacuo to yield alkyl dimethyl ethyl-benzyl ammonium ethyldithiocarbonate as an orange colored oil in approximately the theoretical yield.

*Example II*

In a similar manner, an aliquot of the stock solution of potassium ethylxanthate of Example I containing 0.024 molecular weights of the compound was reacted with a chemically equivalent amount of a 10% solution of a commercial grade of alkyl dimethyl benzyl ammonium chloride (Onyx Chemical Corporation's "BTC–824" in which the alkyl distribution is 60% $C_{14}$, 30% $C_{16}$, 5% $C_{12}$, 5% $C_{18}$). The product, alkyl dimethyl benzyl ammonium ethyldithiocarbonate, was obtained in approximately the theoretical yield as an orange colored oil.

*Example III*

Potassium benzylxanthate solution of 5% strength by weight in water was reacted stoichiometrically with 0.027 molecular weight of the alkyl dimethyl benzyl ammonium chloride of Example II and in the same manner. The organic product layer was removed and vacuum dried. The product, alkyl dimethyl benzyl ammonium benzyldithiocarbonate, was recovered as a viscous orange liquid in the theoretical yield.

*Example IV*

Potassium dodecylxanthate was dissolved in a mixture of alcohol and water at 10% concentration by weight. An aliquot containing 0.020 molecular weights of the salt was reacted with a chemically equivalent amount of a 10% aqueous-alcohol solution of a commercial grade of alkyl isoquinolinium bromide (Onyx Chemical Corporation's "Isothan Q–75" in which the alkyl distribution is 50% $C_{12}$, 30% $C_{14}$, 17% $C_{16}$, 3% $C_{18}$). Part of the alcohol was removed by evaporation; after cooling, the mixture was transferred to a separatory funnel. The organic product layer was separated and vacuum dried to a brown

*Example V*

The potassium xanthate prepared from hexylene glycol (2 methyl-2,4-pentanediol) was dissolved in water to make a 10% solution. An aliquot containing 0.043 molecular weight of this salt was reacted with a chemically equivalent amount of the solution of alkyl dimethyl ethylbenzyl ammonium chloride of Example I and in the same manner. The product, alkyl dimethyl ethyl-benzyl ammonium 2-methyl-2-hydroxy-4-pentyldithiocarbonate, was recovered in substantially the theoretical yield as an orange liquid.

*Example VI*

The potassium xanthate prepared from butyl Cellosolve (ethylene glycol monobutyl ether) was dissolved to make a 10% aqueous solution. An aliquot of this solution containing 0.043 molecular weight of the salt was reacted with a 10% aqueous-alcohol solution of a commercial grade of dodecyl dimethylmenaphthyl ammonium chloride (Onyx Chemical Corporation's "BTC-1100") under vigorous agitation. The alcohol was removed by evaporation. On cooling, the mixture was separated in a separatory funnel and the organic product layer was removed and vacuum dried. The product, dodecyl dimethyl menaphthyl ammonium butoxyethyldithiocarbonate, was recovered in the theoretical yield as a dark yellow solid.

We claim:

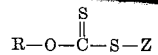

$$R-O-\overset{\overset{S}{\|}}{C}-S-Z$$

wherein Z is the cation of a water-soluble microbiocidal quaternary ammonium compound having an alkyl group of 12 to 18 carbon atoms attached to the quaternary nitrogen and having a phenol coefficient of more than 500 with respect to *Staphylococcus aureus* at 20° C., and wherein R is selected from the group consisting of dodecyl and benzyl.

2. Alkyl dimethyl benzyl ammonium benzyldithiocarbonate wherein the alkyl has 12 to 18 carbon atoms.

3. Alkyl isoquinolinium dodecyldithiocarbonate wherein the alkyl has 12 to 18 carbon atoms.

References Cited

UNITED STATES PATENTS

| | | | |
|---|---|---|---|
| 2,676,986 | 6/1954 | Tesoro et al. | 260—567.6 |
| 2,680,769 | 6/1959 | Tesoro et al. | 260—567.6 |
| 2,700,684 | 1/1955 | Tesoro et al. | 260—567.6 |
| 2,812,332 | 11/1957 | Pennino | 260—294.8 |

OTHER REFERENCES

Schwartz et al.: "Surface Active Agents, vol. II," Interscience, 1958, pages 211 and 222 relied on.

ALEX MAZEL, *Primary Examiner*.

DONALD G. DAUS, *Assistant Examiner*.